United States Patent [19]

Oshiage et al.

[11] Patent Number: 4,961,411

[45] Date of Patent: * Oct. 9, 1990

[54] FUEL CONTROL APPARATUS

[75] Inventors: Katsunori Oshiage; Yasutoshi Nanyoshi, both of Kanagawa, Japan

[73] Assignee: Nissan Motor Company, Limited, Japan

[*] Notice: The portion of the term of this patent subsequent to Nov. 22, 2006 has been disclaimed.

[21] Appl. No.: 191,132

[22] Filed: May 6, 1988

[30] Foreign Application Priority Data

May 18, 1987 [JP] Japan .............................. 62-74939[U]

[51] Int. Cl.$^5$ ............................................. F02D 41/34
[52] U.S. Cl. .................................... 123/492; 123/493; 123/478
[58] Field of Search ................ 123/492, 493, 480, 478

[56] References Cited

U.S. PATENT DOCUMENTS

| | | | |
|---|---|---|---|
| 4,508,085 | 4/1985 | Yamato | 123/492 |
| 4,532,907 | 8/1985 | Buglione et al. | 123/478 |
| 4,785,784 | 11/1988 | Nanyoshi et al. | 123/480 |
| 4,800,860 | 1/1989 | Nanyoshi et al. | 123/492 |

FOREIGN PATENT DOCUMENTS

| | | |
|---|---|---|
| 59-29733 | 2/1984 | Japan . |
| 59-200032 | 11/1984 | Japan .................................. 123/492 |
| 59-211731 | 11/1984 | Japan . |
| 60-195347 | 10/1985 | Japan . |
| 60-233353 | 11/1985 | Japan . |
| 61-76143 | 5/1986 | Japan . |

*Primary Examiner*—Andrew M. Dolinar
*Attorney, Agent, or Firm*—Lowe, Price, LeBlanc, Becker & Shur

[57] ABSTRACT

An apparatus for controlling an internal combustion engine having a plurality of cylinders and fuel injectors provided to inject fuel in a sequential fashion for the respective cylinders. Fuel injection is made twice from a given fuel injector. The control circuit calculates a first value for the amount of fuel injected from the fuel injector during the first fuel injection and a second value for the amount of fuel injected from the fuel injector during the second fuel injection. During transition of the engine operation, an engine load variation is produced between the times at which the first and second values are calculated. A correction factor is calculated based on the engine load variation with an estimation of a first value to be calculated for the cylinder when the fuel injected during the first and second fuel injections is charged in the cylinder.

9 Claims, 10 Drawing Sheets

FUEL CONTROL APPARATUS

BACKGROUND OF THE INVENTION

This invention relates to an apparatus for controlling an internal combustion engine having a plurality of cylinders and fuel injectors provided to inject fuel in a sequential fashion for the respective cylinders and, more particularly, to an engine control apparatus for performing fuel injection twice from each of the fuel injectors to supply fuel in an amount required in one combustion phase of the associated cylinder.

For example, Japanese Kokai No. 61-76143 for Utility Model Registration discloses a fuel control apparatus where fuel injection is made twice to supply the amount of fuel required for each cycle of operation of an engine cylinder. For this purpose, the engine control apparatus calculates a value for the amount of fuel injected from a fuel injector during the first fuel injection according to the engine operating conditions existing at a time just before the first fuel injection is initiated and a value for the amount of fuel injected from the fuel injector during the second fuel injection according to the engine operating conditions existing at a time just before the second fuel injection is initiated. During transition of the engine operation where the engine load is increasing or decreasing, however, the sum of the amount of fuel injected during the first fuel injection and the amount of fuel injected during the second fuel injection is less or greater than the amount of fuel required at the time when the injected fuel is charged in the associated cylinder. Therefore, such a conventional fuel control apparatus fails to provide good fuel control during transition of the engine operation.

SUMMARY OF THE INVENTION

It is a main object of the invention to provide a fuel control apparatus which can provide good fuel control having a fast response to variations in engine operating condition to obtain good reliability and drivability of the engine operation over its entire range.

There is provided, in accordance with the invention, an apparatus for controlling an internal combustion engine having a plurality of cylinders and fuel injectors provided to inject fuel in a sequential fashion for the respective cylinders. The apparatus comprises sensor means for producing electrical signals indicative of existing engine operating conditions including engine load and a control circuit coupled to the sensor means for making first and second fuel injections from each of the fuel injectors to supply fuel in an amount required in one combustion phase of the associated cylinder. The control circuit includes means for determining a first time at which first fuel injection is to be made from a specified fuel injector and a second time at which second fuel injection is to be made from the specified fuel injector, means for calculating a first value for the amount of fuel injected from the specified injector during the first fuel injection according to engine operating conditions existing at a third time just before the first time, means for calculating a second value for the amount of fuel injected from the specified injector during the second fuel injection according to the engine operating conditions existing at a fourth time just before the second time, means for calculating a difference between the first and second values, means for estimating a correction factor according to the calculated difference, means for modifiying the second value by adding the calculated correction factor to the calculated second value, and means for operating the specified fuel injector at the first time to inject fuel in an amount corresponding to the first value and operating the specified fuel injector at the second time to inject fuel in an amount corresponding to the modified second value, the correction factor being determined to compensate for a difference between the sum of the amount of fuel injected from the specified injector during the first fuel injection and the amount of fuel injected from the specified injector during the second fuel injection and a fuel amount required at a time when the injected fuel is charged in the associated cylinder.

In another aspect of the invention, the control circuit includes means for specifying one of the fuel injectors and another fuel injector means for determining a time at which the specified two fuel injectors are to be operated, means for calculating a first value for the amount of fuel injected from the specified one fuel injector during first fuel injection according to the existing engine operating conditions, means for storing the calculated first value in a memory having memory areas provided for the respective fuel injectors, means for reading the last first value calculated previously for the specified another fuel injector from the memory, means for calculating a difference between the last first value for specified another fuel injector and the first value calculated for the specified one fuel injector, means for estimating a correction factor according to the calculated difference, means for calculating a seocnd value for the amount of fuel injected from the specified another fuel injector during second fuel injection, the second value being calculated by adding the calculated correction factor to the first value calculated for the specified one fuel injector, and means for operating the specified one fuel injector at the determined time to inject fuel in an amount corresponding to the first value calculated for the specified one fuel injector and operating the specified another fuel injector at the determined time to inject fuel in an amount corresponding to the second value calculated for the specified another fuel injector.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
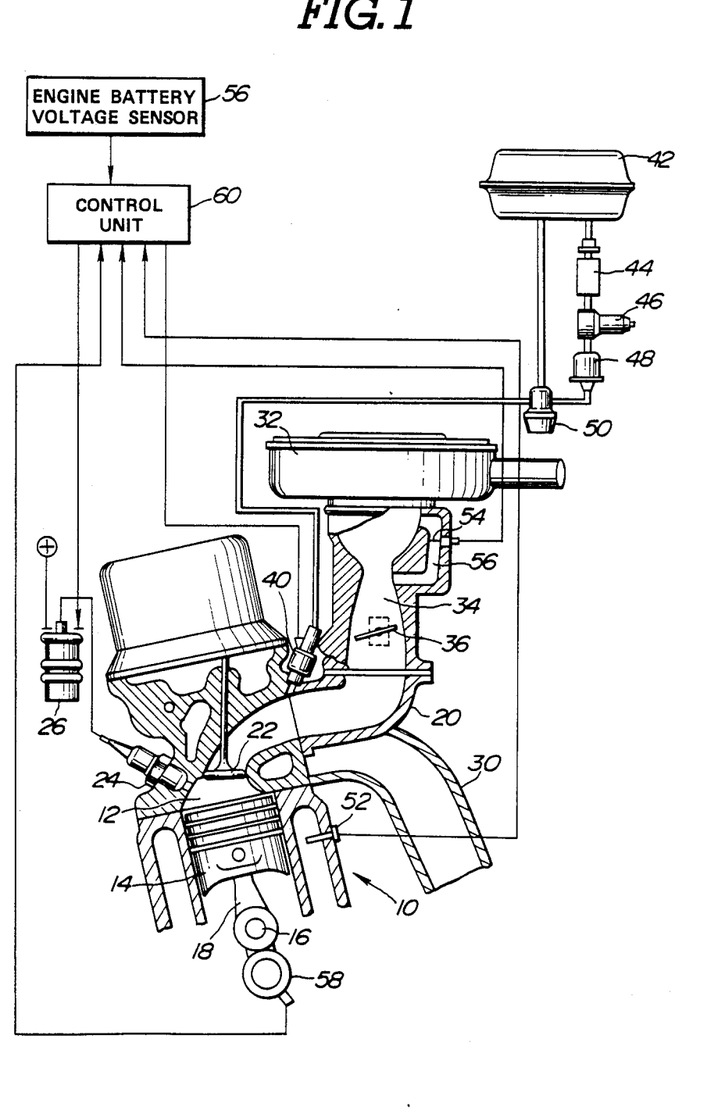
FIG. 1 is a schematic diagram showing one embodiment of a fuel control apparatus made in accordance with the invention.

With rference to the drawings, and in particular to FIG. 1, there is shown a schematic diagram of an engine control system embodying the invention. An internal combustion engine, generally designated by the numeral 10, for an automotive vehicle includes a combustion chamber or cylinder 12. A piston 14 is mounted for reciprocating motion within the cylinder 12. A crankshaft 16 is supported for rotation within the engine 10. Pivotally connected to the piston 14 and the crankshaft 16 is a connecting rod 18 used to produce rotation of the crankshaft 16 in response to reciprocation of the piston 14 within the cylinder 12.

An intake manifold 20 is connected with the cylinder 12 through an intake port with which an intake valve 22 is in cooperation for regulating an entry of combustion ingredients into the cylinder 12 from the intake manifold 20. A spark plug 24 is mounted in the top of the cylinder 12 for igniting the combustion ingredients within the cylinder 12 when the spark plug 24 is energized by the presence of high voltage electrical energy from an ignition coil 26. An exhaust manifold 30 is connected with the cylinder 12 through an exhaust port with which an exhaust valve is in cooperation for regulating the exit of combustion products, exhaust gases, from the cylinder 12 into the exhaust manifold 20. The intake and exhaust valves are driven through a suitable linkage with the crankshaft 16.

Air to the engine 10 is supplied through an air cleaner 32 into an induction passage 34. The amount of air permitted to enter the combustion chamber 12 through the intake manifold 20 is controlled by a butterfly throttle valve 36 situated within the induction passage 34. The throttle valve 36 is connected by a mechanical linkage to an accelerator pedal. The degree of rotation of the throttle valve 36 is manually controlled by the operator of the engine control system.

A fuel injector 40 is connected to a fuel supply system which includes a fuel tank 42, a fuel pump 44, a fuel damper 46, a fuel filter 48, and a pressure regulator 50. The fuel pump 44 is electrically operated and is capable of maintaining sufficient pressure. The fuel damper 46 attenuates the fuel pressure to an extent. The fuel filter 48 prevents any contaminants from reaching the fuel injector 40. The pressure regulator 50 maintains the pressure differential across the fuel injector 40 at a constant level. This regulation is accomplished by a variation in the amount of excess fuel returned by the regulator 50 to the fuel tank 42. The fuel injector 40 opens to inject fuel into the induction passage 34 when it is energized by the presence of electrical current. The length of the electrical pulse, that is, the pulse-width, applied to the fuel injector 40 determines the length of time the fuel injector opens and, thus, determines the amount of fuel injected into the intake manifold 20.

In the operation of the engine 10, fuel is injected through the fuel injector 40 toward the intake port of the cylinder 12 and mixes with the air therein. When the intake valve opens, the air-fuel mixture enters the combustion chamber 12. An upward stroke of the piston 14 compresses the air-fuel mixture, which is then ignited by a spark produced by the spark plug 24 in the combustion chamber 12. Combustion of the air-fuel mixture in the combustion chamber 12 takes place, releasing heat energy, which is converted into mechanical energy upon the power stroke of the piston 14. At or near the end of the power stroke, the exhaust valve opens and the exhaust gases are discharged into the exhaust manifold 30.

Although the engine 10 as illustrated in FIG. 1 show only one combustion chamber 12 formed by a cylinder and piston, it should be understood that the engine control system described here is equally applicable to a multi-cylinder engine. Thus, it should be understood that a four-cylinder engine has four cylinders, four intake valves, four exhaust valves, four reciprocating pistons, four fuel injectors and four spark plugs to ignite the air-fuel mixture within the combustion chambers and that a six-cylinder engine has six cylinders, six intake valves, six exhaust valves, six reciprocating pistons, six fuel injectors and six spark plugs to ignite the air-fuel mixture within the combustion chambers.

The amount of fuel metered to the engine, this being determined by the width of the electrical pulses applied to the fuel injector 40, the fuel-injection timing, and the ignition-system spark timing are repetitively determined from calculations performed by a digital computer, these calculations being based upon various conditions of the engine that are sensed during its operation. These sensed conditions include cylinder-head coolant temperature, intake air flow, engine battery voltage and engine speed. Thus, a cylinder-head coolant temperature sensor 52, a flow meter 54, a engine battery voltage sensor 56, and a crankshaft position sensor 58 are connected to a control unit 60.

The cylinder-head coolant temperature sensor 52 preferably is mounted in the engine cooling system and it comprises a thermistor connected in an electrical circuit capable of producing a DC voltage having a variable level proportional to coolant temperature. The flow meter 54 comprises a thermosensitive wire placed in a bypass passage 34a provided for the induction passage 34 upstream of the throttle valve 36. The engine battery voltage sensor 56 produces a signal proportional to the voltage of the engine battery. The crankshaft position sensor 58 produces a series of crankshaft position electrical pulses C1 each corresponding to one degree of rotation of the engine crankshaft and a series of reference electrical pulses Ca at a predetermined number of degree before the top dead center position of each engine piston.

Figure 2:
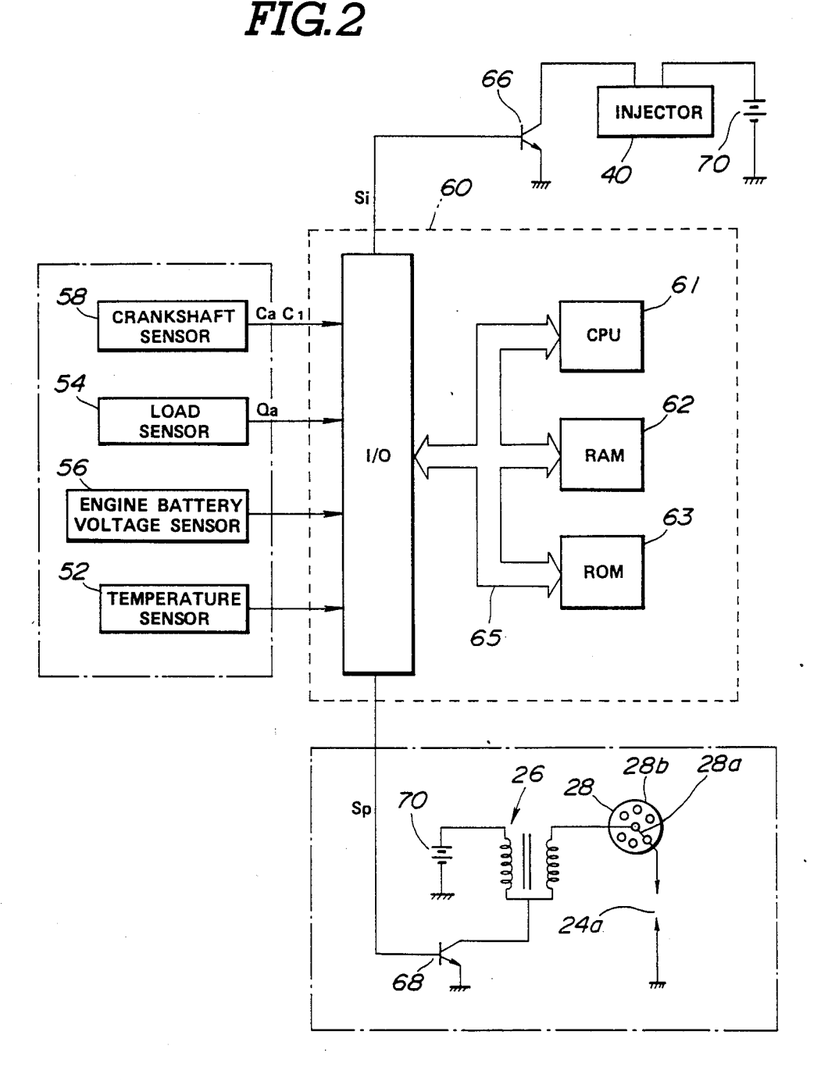
FIG. 2 is a block diagram of the control unit used in the apparatus of FIG. 1.

Referring to FIG. 2, the control unit 60 comprises a digital computer which includes a central processing unit (CPU) 61, a random access memory (RAM) 62, a read only memory (ROM) 63, and an input/output control circuit (I/O) 64. The central processing unit 61 communicates with the rest of the computer via data bus 65. The input/output control circuit 64 includes a counter which counts the reference pulses Ca fed from the crankshaft position sensor 58 and converts its count into an engine speed indicating digital signal for application to the central processing unit 61. The input/output control circuit 64 also includes an analog-to-digital converter which receives analog signals from the flow meter 54, and other sensors and converts them into digital form for application to the central processing unit 61. The A to D conversion process is initiated on command from the central processing unit 61 which selects the input channel to be converted. The read only memory 63 contains the program for operating the central processing unit 61 and further contains appropriate data in look-up tables used in calculating appropriate values for fuel delivery requirements and ignition-system spark timing. Control words specifying desired fuel delivery requirements and ignition-system spark timing are periodically transferred by the central processing unit 61 to the fuel-injection and spark-timing control circuits included in the input/output control circuit 64. The fuel injection control circuit converts the received control word into a fuel injection pulse signal Si for application to a power transistor 66. The power transistor 66 connects the fuel injector 40 to the engine battery 70 for a time period determined by the width of the fuel injection control pulse signal Si. The spark timing control circuit converts the received control word into a spark timing control pulse signal Sp for application to a power transistor 68. The power transistor 68 connects the ignition coil 26 to the engine battery 70 for a time period determined by the width of the spark timing control pulse signal Sp.

The ignition system includes a distributor 28 connected with the ignition coil 26 to energize the spark plugs 24 of the engine. For this purpose, the ignition coil 26 has a primary winding connected across the engine battery 70 through the power transistor 68. The ignition coil 26 has a high voltage terminal connected to a rotor 28a of the distributor 28. The rotor 28a is driven at one-half the rotational velocity of the crankshaft 16. The distributor 28 has electrical contacts 28b each of which is connected in the usual manner by separate electrical leads to the spark plugs 24 of the engine. As the distributor rotor 28a rotates, it sequentially contacts the electrical contacts 28b to permit high voltage electrical energy to be supplied at appropriate intervals to the spark plugs 24, causing sparks to be generated across the gaps 24a of the respective spark plugs 24.

Figure 3:
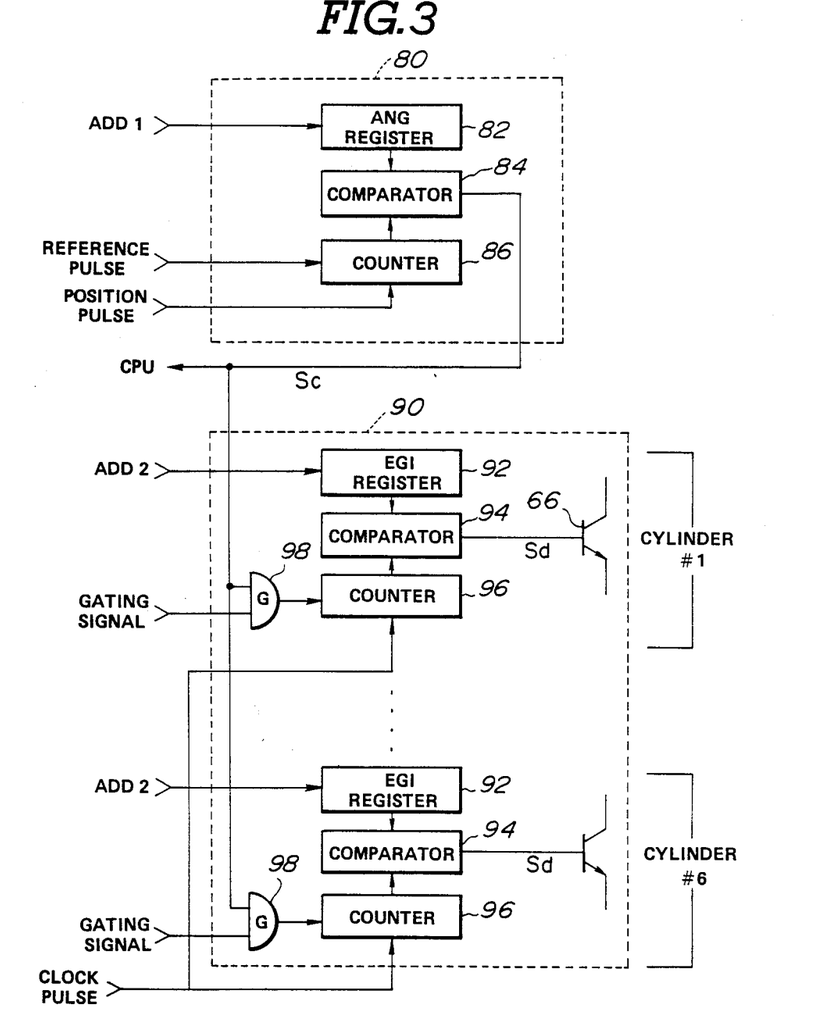
FIG. 3 is a block diagram showing the fuel injection control circuit used in the control unit of FIG. 2.

Referring to FIG. 3, the fuel injection control circuit includes a fuel-injection timing control circuit 80 and a fuel-injection interval control circuit 90. The fuel-injection timing control circuit 80 includes an ANG register 82, a comparator 84 and a counter 86. The ANG register 82 loads the calculated fuel-injection timing digital value ADD1 transferred thereto from the central processing unit 61. The counter 86 counts the crankshaft position pulses C1 fed thereto from the crankshaft position sensor 58. The counter 86 responds to a reference pulse Ca fed thereto from the crankshaft position sensor 58 by clearing its count and starting its counting operation. For example, the reference pulse is generated at 120 degrees of rotation of the crankshaft when the invention is applied to a four-cylinder engine. The comparator 84 compares the count of the counter 86 with the digital value ADD1 loaded on the ANG register 82 and produces a control signal Sc. This control signal changes from a high level to a low level when the counter 86 is cleared. The control signal Sc changes from the low level to the high level when the count of the counter 86 reaches the digital value ADD1 loaded on the ANG register 82.

The fuel-injection interval control circuit 90 includes a plurality of sets of an EGI register 92, a comparator 94, a counter 96 and an AND gate circuit 98 provided for the respective cylinders. The EGI register 92 loads the calculated fuel-injection pulse-width digital value ADD2 transferred thereto from the central processing unit 61. The counter 96 counts clock pulses fed thereto from a clock pulse source. A gating signal is fed from the central processing unit 61 to place the AND gate circuit 98 into its open state permitting application of a high-level control signal Sc to the counter 96 which thereby clears its count and starts its counting operation. The comparator 94 produces a control pulse signal Sd to the power transistor 66. This control pulse signal Sd changes from a low level to a high level turning on the power transistor 66 when the counter is cleared. The control pulse signal Sd changes from the high level to the low level turning off the power transistor 68 when the count of the counter 96 reaches the digital value ADD2 loaded on the EGI register 92.

Thus, the fuel injector 40 opens to initiate fuel injection when the count of the counter 86 reaches the fuel-injection timing digital value ADD1 and closes to terminate the fuel injection when the count of the counter 96 reaches the fuel-injection pulse-width digital value ADD2 loaded on the EGI register 92.

Figure 4:
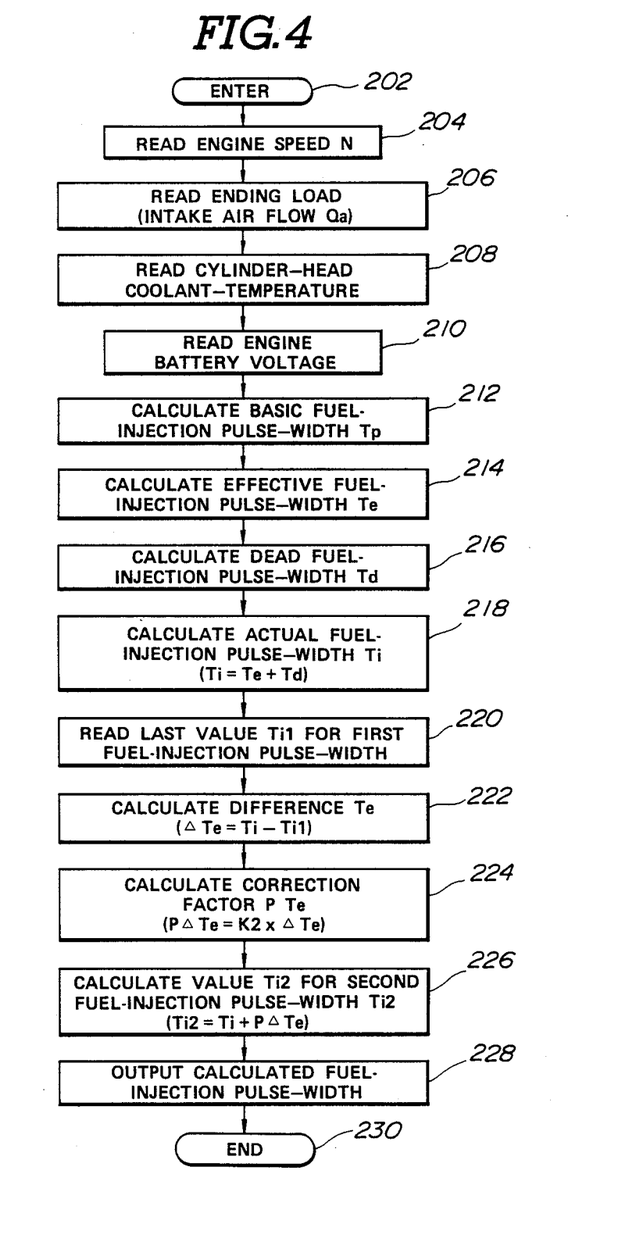
FIGS. 4, 5, 6 and 7 are flow diagrams illustrating the programming of the digital computer of the control unit.

FIG. 4 is a flow diagram illustrating the programming of the digital computer as it is used to calculate a desired value for fuel delivery requirement in form of fuel-injection pulse-width. The computer program is entered at the point 202 at uniform time intervals, for example, of 10 milliseconds. At the point 204 in the program, the engine speed signal is read into the random access memory 62. At the point 206, the intake air flow signal fed from the flow meter 54 is converted to digital form and read into the random access memory 62. Similarly, at the point 208, the cylinder-head coolant-temperature signal is converted to digital form and read into the random access memory 62. Likewise, at the point 210, the engine battery voltage signal is converted to digital form and read into the random access memory 62.

At the point 212 in the program, the fuel-delivery requirement, in the form of basic fuel-injection pulse-width Tp, is calculated by the digital computer central processing unit 61 from a relationship defines basic fuel-injection pulse-width Tp as $Tp = K1 \times (Qa/N)$ where Qa is the engine load, as inferred from measurement of intake air flow, N is the engine speed, and K1 is a constant. At the point 214, the central processing unit 61 calculates an effective value Te for fuel-injection pulse-width from a relationship programmed into the computer. This step serves to compensate for variations in cylinder-head coolant-temperature. It is to be understood that the effective value Te corresponds to the amount of fuel to be injected from a given fuel injector during the first fuel injection, this fuel amount being one-half the amount of fuel required in the associated cylinder under the engine operating conditions existing at the time when the effective value Te is calculated.

At the point 216, the central processing unit 61 calculate a dead value Td for fuel-injection pulse-width from a relationship programmed into the computer. This relationship defines dead value Td as a function of engine battery voltage. At the point 218, the central processing unit 61 calculates an actual value Ti for fuel-injection pulse-width by adding the calculated dead value Td to the effective value Te. This step serves to compensate for engine battery voltage drops. It is to be understood that the fuel injector opens for a time period corresponding to the effective value Te when the pulse width of a fuel-injection control pulse supplied to the fuel injector is equal to the actual value Ti.

At the point 220 in the program, the last fuel-injection pulse-width value Ti1 is read from the random access memory 62. The last value Ti1 was calculated previously for the first fuel injection from a given fuel injector for which a second fuel-injection pulse-width value Ti2 is to be calculated in this cycle of execution of this program and was stored in the random access memory 62 at a location assigned to the cylinder associated with the given fuel injector. At the point 222, the central processing unit 61 calculates a difference ΔTe by substracting the last value Ti1 from the calculated actual value Ti. At the point 224, the central processing unit 61 estimates a correction factor PΔTe as PΔTe=K2×ΔTe where K2 is a constant or as PΔTe=f(N)×ΔTe where N is the engine speed. The latter equation is used when it is required to convert a time interval into a corresponding interval of a number of degrees of crankshaft rotation. The calculated correction factor PΔTe is determined to compensate for a diffrence between the sum of the amount of fuel injected from a given fuel injector during the first fuel injection and the amount of fuel injected from the given fuel injector during the second fuel injection and a fuel amount required at a time when the injected fuel is charged in the associated cylinder.

At the point 226 in the program, the central processing unit 61 calculates a value Ti2 for second fuel-injection pulse-width by adding the calculated value PΔTe to the calculated actual value Ti. The calculated value Ti2 is used for the second fuel injection. At the point 228, the calculated values Ti and Ti2 are outputted. Following this, the program proceeds to the end point 230.

Figure 5:
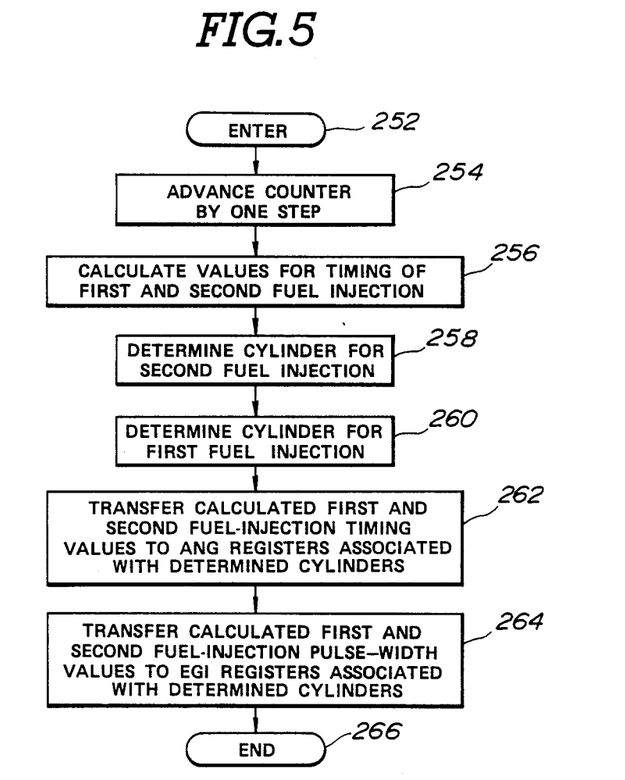

FIG. 5 is a flow diagram illustrating the programming of the digital computer as it is used to determine appropriate values for timing of first and second fuel injection. The computer program is entered at the point 252 in response to a reference signal produced at 120 degrees of rotation of the crankshaft. At the point 254 in the program, a reference counter counts up by one step. At the point 256, points, in terms of crankshaft angular position after the point at which the new reference signal is produced, at which the first and second fuel injection is to be initiated by energization of given fuel injectors 40. The value for second fuel-injection timing is calculated in such a manner to assure that fuel injection will be terminated a predetermined time before the closing of the corresponding engine intake valve. For this calculation, the fuel-injection pulse-width increase PΔTe and the interval between the time at which fuel is injected from the fuel injector and the time at which the injected fuel reaches the intake valve are taken into account by the fuel control apparatus.

At the point 258 in the program, the central processing unit 61 determines the cylinder for which the second fuel injection is to be initiated within the interval of 120 degrees of crankshaft rotation. At the point 260, the central processing unit determines the cylinder for which the first fuel injection is to be initiated within the interval of 120 degrees of crankshaft rotation. At the point 262 in the program, the central processing unit 61 transfers the calculated value for fuel-injection timing to the ANG register 82 and at the same time produces a high-level gating signal to open the AND gate circuits 98 associated with the determined cylinders. At the point 264, the central processing unit 61 transfers the calculated values Ti and Ti2 for fuel-injection pulse-width to the EGI registers 92 associated with the determined cylinders, respectively. Following this, the program proceeds to the end point 266.

Figure 6:
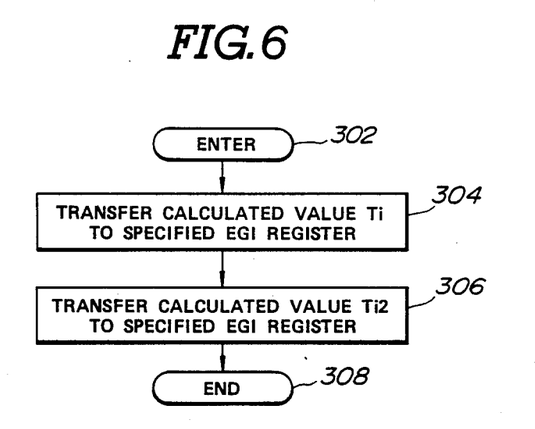

FIG. 6 is a flow diagram illustrating the programming of the digital computer as it is used to transfer the calculated values Ti for first fuel-injection pulse-width and the calculated value Ti2 for second fuel-injection pulse-width. The computer program is entered at the point 302 at uniform time intervals, for example, of 10 milliseconds or in response to a reference signal produced at 120 degrees of crankshaft rotation. At the point 304 in the program, the central processing unit 61 transfers the calculated value Ti for first fuel-injection pulse-width to the EGI register 92 which is associated with the determined cylinder for which first fuel injection is to be made. At the point 306, the central processing unit 61 transfers the calculated value Ti2 for second fuel-injection pulse-width to the EGI register 92 which is associated with the determined cylinder for which second fuel injection is to be made. Following this, the program proceeds to the end point 308.

Figure 7:
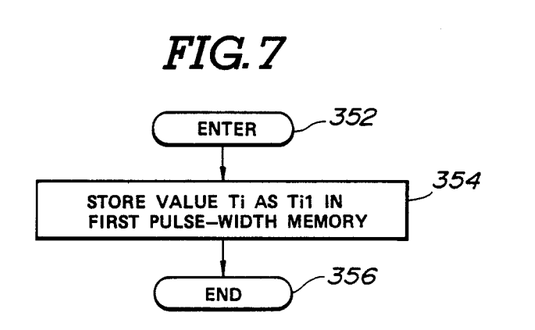

FIG. 7 is a flow diagram illustrating the programming of the digital computer as it is used to store the calculated value Ti for first fuel-injection pulse-width. The computer program is entered at the point 352 each time the comparator 94 associated with the EGI register 92 to which the calculated value Ti is transferred produces a fuel-injection control pulse Sd. At the point 354 in the program, the calculated value Ti is stored as Ti1 in the random access memory 62 having memory areas provided for the respective cylinders. Following this, the program proceeds to the end point 356.

The operation of the fuel control apparatus of the invention will be described with reference to FIGS. 8 and 9 where the invention is applied to a four-stroke, six-cylinder engine having six fuel injectors arranged to inject fuel in a sequential fashion for the respective cylinders. The sequence or order of fuel injection of the engine is as follows: Cylinders #1, #2, #3, #4, #5 and #6.

Figure 8:
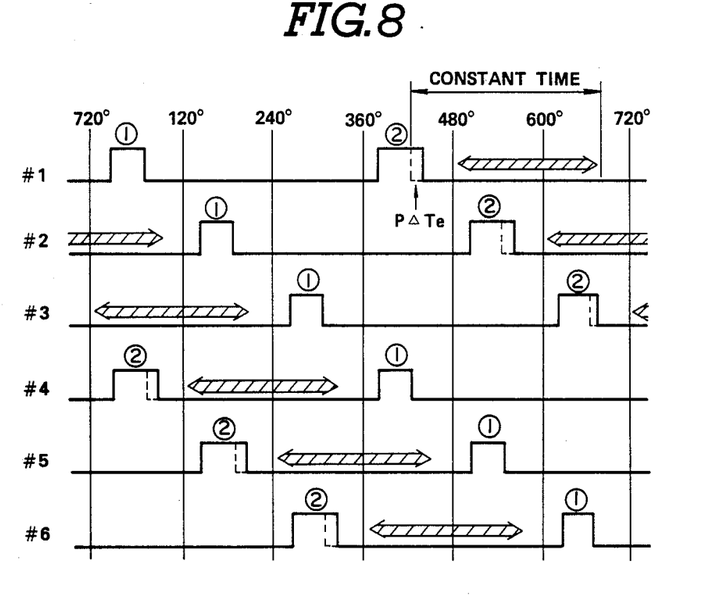
FIGS. 8 and 9 are diagrams used in explaining the operation of the fuel control apparatus of the invention.
Figure 9:
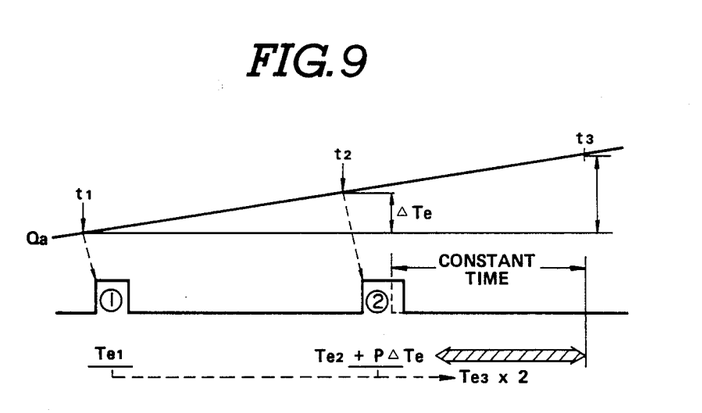

As shown in FIG. 8, during one of calculation cycles performed at uniform time intervals, for example, of 10 milliseconds, the central processing unit 61 calculates a first value Ti which determines the amount of fuel injected during the first fuel injection for a given cylinder (for example, cylinder #1) and a second value Ti2 which determines the amount of fuel injected during the second fuel injection for the cylinder (for example, cylinder #4) where the first fuel injection is initiated at a time retarded 360 degrees of crankshaft rotation with respect to the time at which the first fuel injection is initiated for the given cylinder (cylinder #1).

Fuel injection from a given fuel injector is initiated at uniform intervals of 360 degrees of rotation of the crankshaft. The first fuel injection is initiated at a time advanced sufficiently before the opening of the associated intake valve. The second fuel injection is initiated at a time just before the opening of the associated intake valve and terminated a constant time before the closing of the associated intake valve. In FIGS. 8 and 9, the hatched arrow indicates the period during which the associated intake valve is open. The first fuel-injection pulse-width value Ti1, which is used for determining the amount of fuel injected through the given cylinder during the first fuel injection ①, is calculated according to the engine operating conditions existing at a time t1 just before the first fuel injection ① is initiated. In this embodiment, the amount of fuel injected from the given fuel injector during the first fuel injection ① is one-half the amount of fuel required in one operation cycle of the associated cylinder for the same engine operating conditions. The fuel-injection pulse-width value Ti2, which is used for determining the amount of fuel injected from the given cylinder during the second fuel injection ②, is calculated at a time t2 by adding a correction factor PΔTe to the first fuel-injection pulse-width value Ti calculated according to the engine operating conditions existing at a time t2 just before the second fuel injection ②  is initiated. The correction factor P$\Delta$Te is estimated based on a difference between the first fuel-injection pulse-width values Ti1 and Ti, the difference corresponding to an engine load variation produced between the times t1 and t2. The correction factor P$\Delta$Te is determined to satisfy a relationship represented as $Ti1 + Ti = 2 \times Ti0$ with an estimation of the next first value ti0 to be calculated for the given cylinder at a time t3. It is to be noted that the next first value Ti0 is to be calculated according to the engine operating conditions existing when the associated intake valve closes. Thus, the correction factor P$\Delta$Te can compensate for a fuel shortage produced due to an engine load variation produced between the time t1 at which the value Ti1 is calculated and the time t3 at which the fuel injected during the first and second fuel injection is charged into the associated cylinder.

Therefore, it is possible to provide good fuel control having a fast response to variations in engine operating conditions to obtain good reliablity and drivability of engine operation over its entire range.

Although the calculated first fuel-injection pulse-width value Ti corresponds to a fuel amount one-half the amount of fuel required in one operation cycle of the associated cylinder, it is to be noted that the ratio of the fuel amount injected during the first fuel injection to the fuel amount required in one operation cycle of the associated cylinder is not limited to ½ and may be a desired value a/(a+b). In this case, the correction factor P$\Delta$Te is determined to satisfy the following equation:

$$2 \times Ti0 = 2 \times Ti1 \times a/(a+b) + \\ 2 \times Ti \times b/(a+b) + \\ 2 \times P\Delta Te \times a/(a+b)$$

Although the second value Ti2 is calculated by adding the correction factor P$\Delta$Te to the calculated first value during transient of the engine operating condition where the engine load is increasing, it is to be understood that the second value Ti2 may be calculated by subtracting the correction factor P$\Delta$Te from the calculated first value Ti during transition of the engine operating condition where the engine load is decreasing. In addition, although the invention has been described in connection with a six-cylinder engine, it is to be understood, of course, that it is equally applicable to four-cylinder and other engines.

Figure 10:
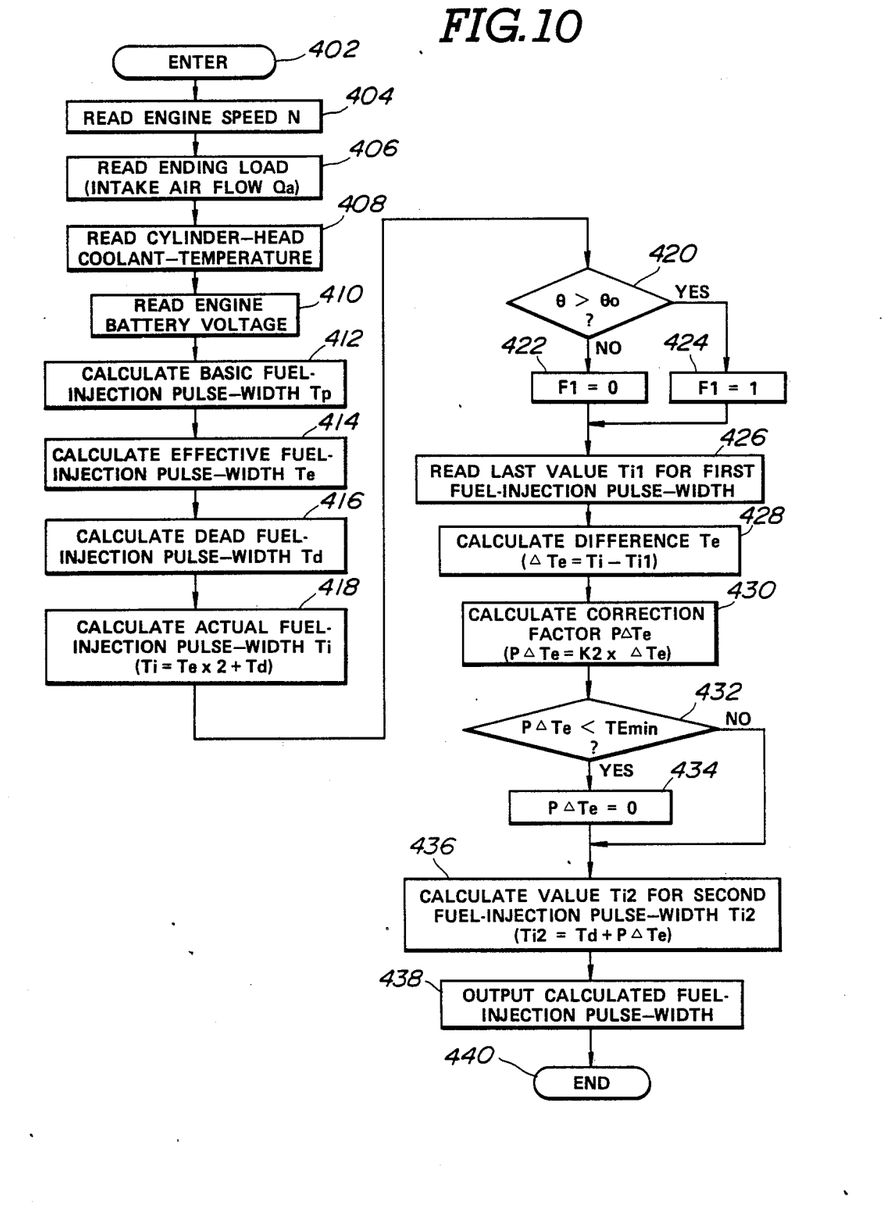
FIGS. 10 and 11 are flow diagram illustrating the programming of the digital computer used in a second embodiment of the fuel control apparatus of the invention.

FIG. 10 is a flow diagram illustrating the programming of the digital computer as it is used to calculate a desired value for fuel delivery requirement in form of fuel-injection pulse-width. In this case, the fuel amount injected during the first fuel injection is equal to the amount of fuel required in one operation cycle of the associated cylinder. The computer program is entered at the point 402 at uniform time intervals, for example, of 10 milliseconds. At the point 404 in the program, the engine speed signal is read into the random access memory 62. At the point 406, the intake air flow signal fed from the flow meter 54 is converted to digital form and read into the random access memory 62. Similarly, at the point 408, the cylinder-head coolant-temperature signal is converted to digital form and read into the random access memory 62. Likewise, at the point 410, the engine battery voltage signal is converted to digital form and read into the random access memory 62.

At the point 412 in the program, the fuel-delivery requirement, in the form of basic fuel-injection pulse-width Tp, is calculated by the digital computer central processing unit 61 from a relationship programmed into the computer. This relationship defines basic fuel-injection pulse-width Tp as $Tp = K1 \times (Qa/N)$ where Qa is the engine load, as inferred from measurement of intake air flow, N is the engine speed, and K1 is a constant. At the point 414, the central processing unit 61 calculates an effective value Te for fuel-injection pulse-width from a relationship programmed into the computer. This step serves to compensate for variations in cylinder-head coolant-temperature. It is to be understood that the effective value Te corresponds to the amount of fuel to be injected from a given fuel injector during the first fuel injection, this fuel amount being one-half the amount of fuel required in the associated cylinder under the engine operating conditions existing at the time when the effective value Te is calculated.

At the point 416, the central processing unit 61 calculate a dead value Td for fuel-injection pulse-width from a relationship programmed into the computer. This relationship defines dead value Td as a function of engine battery voltage. At the point 418, the central processing unit 61 calculates an actual value Ti for fuel-injection pulse-width as $Ti = Te \times 2 + Td$. This step serves to compensate for engine battery voltage drops. It is to be understood that the fuel injector opens for a time period corresponding to Te$\times$2 when the pulse width of a fuel-injection control pulse supplied to the fuel injector is equal to the actual value Ti.

At the point 420 in the program, a determination is made as to whether or not the first fuel injection continues. This determination is made by comparing a crankshaft angular position $\theta$ with a predetermined crankshaft angular position $\theta$o. The crankshaft angular position $\theta$ is given as:

$$\theta = (Ti[ms]/1000) \times (N[rmp]/60) \times 360[°]$$

If $\theta > \theta$o, then it means that the first fuel injuection continues and the program proceeds to the point 422 where a flag FI is set to indicate that the first fuel injection continues. Following this, the program proceeds to the point 426. Otherwise, the program proceeds from the point 420 to the point 424 where the flag FI is cleared. Following this, the program proceeds to the point 426.

At the point 426 in the program, the last fuel-injection pulse-width value Ti1 is read from the random access memory 62. The last value Ti1 was calculated previously for the first fuel injection from a given fuel injector for which a second fuel-injection pulse-width value Ti2 is to be calculated in this cycle of execution of this program and was stored in the random access memory 62 at a location assigned to the cylinder associated with the given fuel injector. At the point 428, the central processing unit 61 calculates a difference $\Delta$Te by subtracting the last value Ti1 from the calculated actual value Ti. At the point 430, the central processing unit 61 estimates a correction factor P$\Delta$Te as $P\Delta Te = K2 \times \Delta Te$ where K2 is a constant or as $P\Delta Te = f(N) \times \Delta Te$ where N is the engine speed. The latter equation is used when it is required to convert a time interval into a corresponding interval of a number of degrees of crankshaft rotation. The calculated correction factor P$\Delta$Te is determined to compensate for a difference between the sum of the amount of fuel injected from a given fuel injector during the first fuel injection and the amount of fuel injected from the given fuel injector during the second fuel injection and a fuel amount required at a time when the injected fuel is charged in the associated cylinder.

At the point 432 in the program, a determination is made as to whether or not the calculated correction factor PΔTe is less than a lower limit TEmin. If the calculated correction factor PΔTe is less than the lower limit TEmin, then the program proceeds to the point 434 where the correction factor PΔTe is set at zero. Following this, the program proceeds to the point 436. Otherwise, the program proceeds from the point 432 directly to the point 436. These steps are effective for fuel injectors having poor fuel metering characteristics in response to a small fuel-injection pulse-width.

At the point 436 in the program, the central processing unit 61 calculates a value Ti2 for second fuel-injection pulse-width by adding the calculated dead value Td to the calculated correction factor PΔTe. The calculated value Ti2 is used for the second fuel injection. At the point 438, the calculated values Ti and Ti2 are transferred to the EGI registers 92. Following this, the program proceeds to the end point 440.

Figure 11:
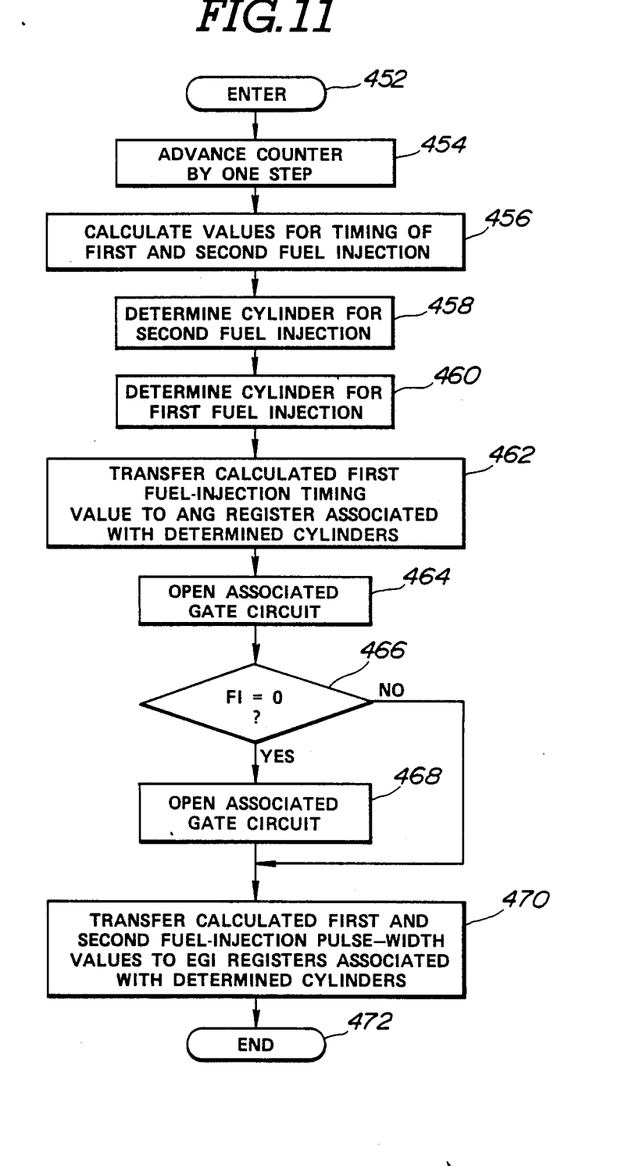

FIG. 11 is a flow diagram illustrating the programming of the digital computer as it is used to determine appropriate values for timing of first and second fuel injection. The computer program, is entered at the point 452 in response to a reference signal produced at 120 degrees of rotation of the crankshaft. At the point 454 in the program, a reference counter counts up by one step. At the point 456, points, in terms of crankshaft angular position after the point at which the new reference signal is produced, at which the first and second fuel injection is to be initiated by energization of given fuel injectors 40. The value for second fuel-injection timing is calculated in such a manner to assure that fuel injection will be terminated a predetermined time before the closing of the corresponding engine intake valve. For this calculation, the fuel-injection pulse-width increase PΔTe and the interval between the time at which fuel is injected from the fuel injector and the time at which the injected fuel reaches the intake valve are taken into account by the fuel control apparatus.

At the point 458 in the program, the central processing unit 61 determines the cylinder for which the second fuel injection is to be initiated within the interval of 120 degrees of crankshaft rotation. At the point 460, the central processing unit determines the cylinder for which the first fuel injection is to be initiated within the interval of 120 degrees of crankshaft rotation. At the point 462 in the program, the central processing unit 61 transfers the calculated value for fuel-injection timing to the ANG registor 82. At the point 464 in the program, the central processing unit 61 produces a high-level gating signal to open the AND gate circuit 98 associated with the cylinder determined for the first fuel injection.

At the point 466 in the program, a determination is made as to whether or not the flag FI is cleared. If the answer to this question is "yes", then it means that the first fuel injection is not effected and the program proceeds to the point 468 where the central processing unit 61 produces a high-level gating signal to open the AND gate circuit 98 associated with the cylinder determined for the second fuel injection. Following this, the program proceeds to the point 470. If the flag FI is set, then it means that the first fuel injection continues and the program proceeds from the point 466 directly to the point 470. These steps serves to inhibit the second fuel injection so as to avoid the condition where the first fuel injection cannot be completed.

At the point 470 in the program, the central processing unit 61 transfers the calculated values Ti and Ti2 for fuel-injection pulse-width to the EGI registers 92 associated with the determined cylinders, respectively. Following this, the program proceeds to the end point 472.

The operation of the fuel control apparatus of the invention will be described with reference to FIGS. 12 and 13 where the invention is applied to a four-stroke, six-cylinder engine having six fuel injectors arranged to inject fuel in a sequential fashion for the respective cylinders. The sequence or order of fuel injection of the engine is as follows: Cylinders #1, #2, #3, #4, #5 and #6.

Figure 12:
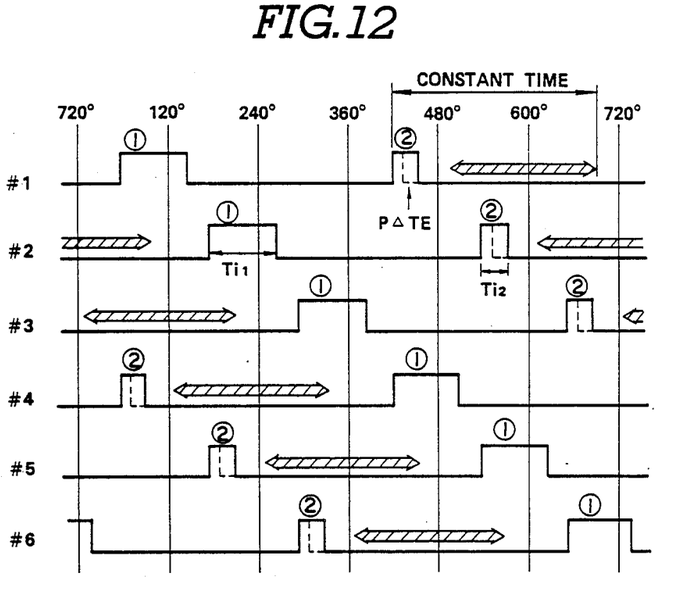
FIGS. 12 and 13 are diagrams used in explaining the second embodiment of the fuel control apparatus of the invention.
Figure 13:
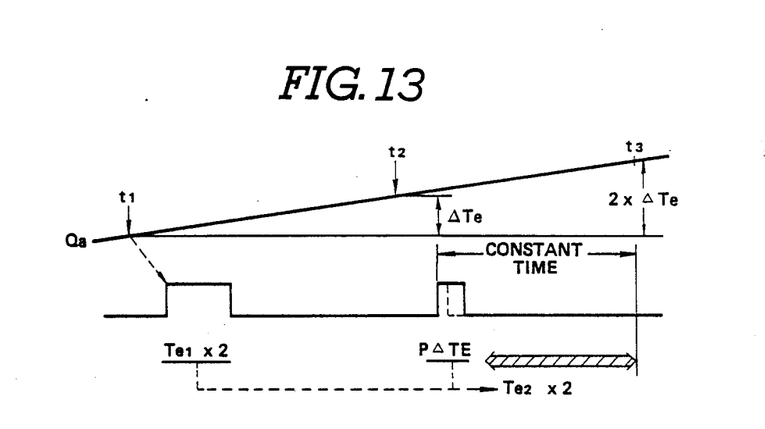

As shown in FIG. 12, during one of calculation cycles performed at uniform time intervals, for example, of 10 milliseconds, the central processing unit 61 calculates a first value Ti which determines the amount of fuel injected during the first fuel injection for a given cylinder (for example, cylinder #1) and a second value Ti2 which determines the amount of fuel injected during the second fuel injection for the cylinder (for example, cylinder #4) where the first fuel injection is initiated at a time retarded 360 degrees of crankshaft rotation with respect to the time at which the first fuel injection is initiated for the given cylinder (cylinder #1).

Fuel injection from a given fuel injector is initiated at uniform intervals of 360 degrees of rotation of the crankshaft. The first fuel injection is initiated at a time advanced sufficiently before the opening of the associated intake valve. The second fuel injection is initiated at a time just before the opening of the accociated intake valve and terminated a constant time before the closing of the associated intake valve. In FIGS. 12 and 13, the hatched arrow indicates the period during which the associated intake valve is open. The first fuel-injection pulse-width value Ti1, which is used for determining the amount of fuel injected through the given cylinder during the first fuel injection ①, is calculated according to the engine operating conditions existing at a time t1 just before the first fuel injection ① is initiated. In this embodiment, the amount of fuel injected from the given fuel injector during the first fuel injection ① is equal to the amount of fuel required in one operation cycle of the associated cylinder for the same engine operating conditions. The fuel-injection pulse-width value Ti2, which is used for determining the amount of fuel injected from the given cylinder during the second fuel injection ②, is calculated at a time t2 by adding a correction factor PΔTe to the calculated dead value Td. The correction factor PΔTe is determined based on a difference between the first fuel-injection pulse-width values Ti1 and Ti, the difference corresponding to an engine load variation produced between the times t1 and t2. The correction factor PΔTe is determined to satisfy a relationship represented as $Ti1 \times 2 + P\Delta Te \times 2 = Ti0 \times 2$ with an estimation of the next first value Ti0 to be calculated for the given cylinder at a time t3. It is to be noted that the next first value Ti0 is to be calculated according to the engine operating conditions existing when the associated intake valve closes. Thus, the correction factor PΔTe can compensate for a fuel shortage produced due to an engine load variation produced between the time t1 at which the value Ti1 is calculated and the time t3 at which the fuel injected during the first and second fuel injection is charged into the associated cylinder.

Therefore, it is possible to provide good fuel control having a fast response to variations in engine operating conditions to obtain good reliability and drivability of engine operation over its entire range.

What is claimed is:

1. An apparatus for controlling an internal combustion engine having a plurality of cylinders, and fuel injectors provided for the respective cylinders, comprising:
   sensor means for producing electrical signals indicative of existing engine operating conditions including engine load; and
   a control unit coupled to the sensor means for operating the fuel injectors in a predetermined sequence, the control unit including means responsive to the sensor means for repetitively calculating a fuel-delivery requirement value based on the existing engine operating conditions, means for operating each of the fuel injectors to initiate first and second fuel injections for supplying fuel in an amount required in one combustion phase of the associated cylinder, the first fuel injection being initiated at a first time, the second fuel injection being initiated at a second time delayed with respect to the first time within said one combustion phase, means for determining a first fuel amount value required for the first fuel injection based on the fuel-delivery requirement value calculated just before the first time, means for calculating a difference between the fuel-delivery requirement value calculated just before the first time and the fuel-delivery requirement value calculated just before the second time, and means for determining a second fuel amount value required for the second fuel injection based on the calculated difference.

2. The apparatus as claimed in claim 1, wherein the control unit includes means for estimating a fuel-delivery requirement value to be calculated at a time when the injected fuel is charged in the associated cylinder based on the calculated difference, and means for correcting the second fuel amount based on the estimated fuel delivery requirement value.

3. The apparatus as claimed in claim 2, wherein the control unit includes means for calculating difference, and means for calculating the second fuel amount value based on the calculated correction factor.

4. The apparatus as claimed in claim 3, wherein the control unit includes means for calculating the correction factor $P\Delta Te$ as $P\Delta Te = K \times \Delta Te$ where $\Delta Te$ is the calculated difference, and K is a constant.

5. The apparatus as claimed in claim 4, wherein the control unit includes means for determining the constant K to substantially satisfy a relationship represented as $Ti1 + Ti = 2Ti0$ where Ti1 is the fuel-delivery requirement value calculated just before the first time, Ti is the fuel-delivery requirement value calculated just before the second time, and Ti0 is the estimated fuel-delivery requirement value.

6. The apparatus as claimed in claim 2, wherein the first fuel amount value is equal to one-half the fuel-delivery requirement value calculated just before the first time, and wherein the second fuel amount value Ti2 is determined as $Ti2 = Ti1 + K \times \Delta Te$ where Ti1 is the first fuel amount value, $\Delta Te$ is the calculated difference, and K is a constant.

7. The apparatus as claimed in claim 6, wherein the control unit includes means for determining the constant K to substantially satisfy a relationship represented as $Ti1 + Ti = 2Ti0$ where Ti1 is the determined first fuel amount value, Ti is the fuel-delivery requirement value calculated just before the second time, and Ti0 is the estimated fuel-delivery requirement value.

8. The apparatus as claimed in claim 2, wherein the first fuel amount value is equal to the fuel-delivery requirement value calculated just before the first time, and wherein the second fuel amount value Ti2 is determined as $Ti2 = K \times \Delta Te$ where $\Delta Te$ is the calculated difference, and K is a constant.

9. The apparatus as claimed in claim 8, wherein the control unit includes means for determining the constant K to substantially satisfy a relationship represented as $Ti1 + Ti = 2Ti0$ where Ti1 is the determined first fuel amount value, Ti is the fuel-delivery requirement value calculated just before the second time, and Ti0 is the estimated fuel-delivery requirement value.

* * * * *